Dec. 5, 1933.  W. D. McADOO  1,938,037
MEANS FOR SEPARATING VALUABLE MINERALS
Filed June 16, 1932   4 Sheets—Sheet 1
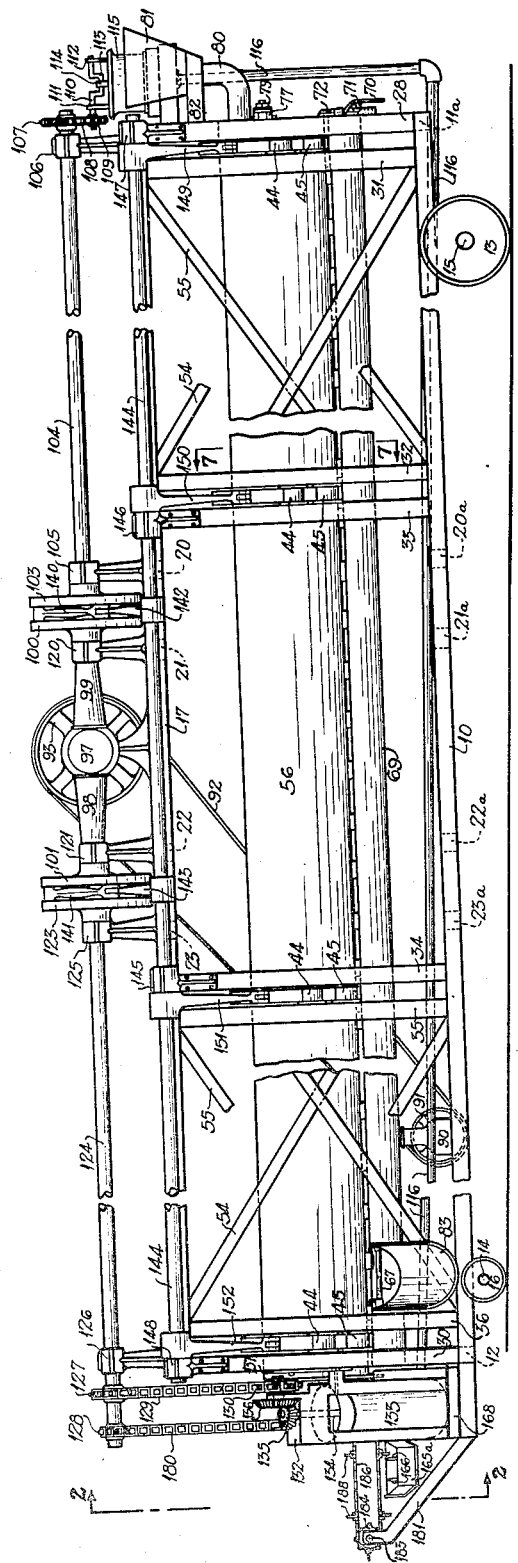
Inventor:
WILLIAM D. McADOO
By Paul S Eaton
Attorney Dec. 5, 1933.    W. D. McADOO    1,938,037
MEANS FOR SEPARATING VALUABLE MINERALS
Filed June 16, 1932    4 Sheets-Sheet 2
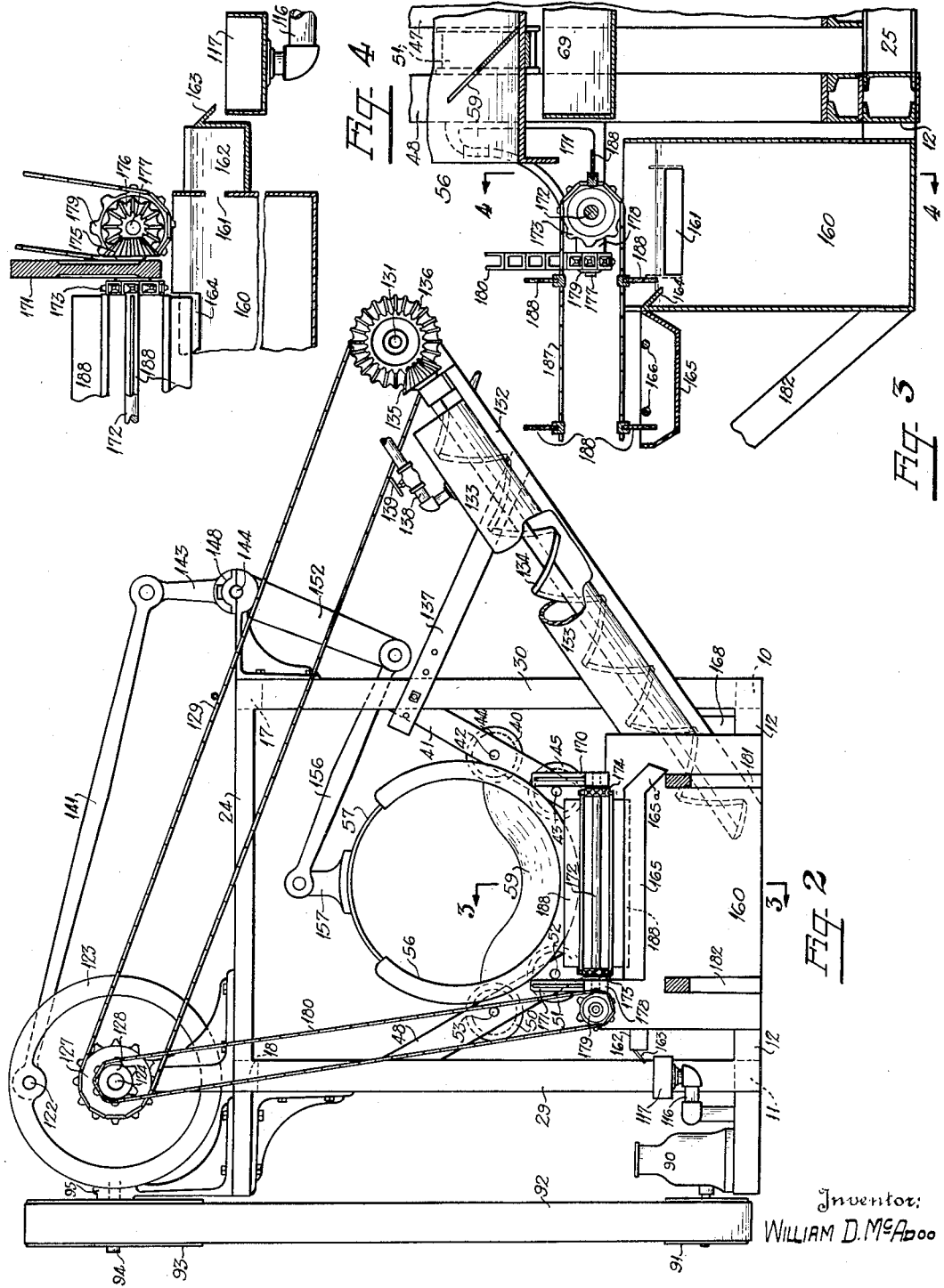
Inventor:
WILLIAM D. McADOO
By Paul S Eaton
Attorney

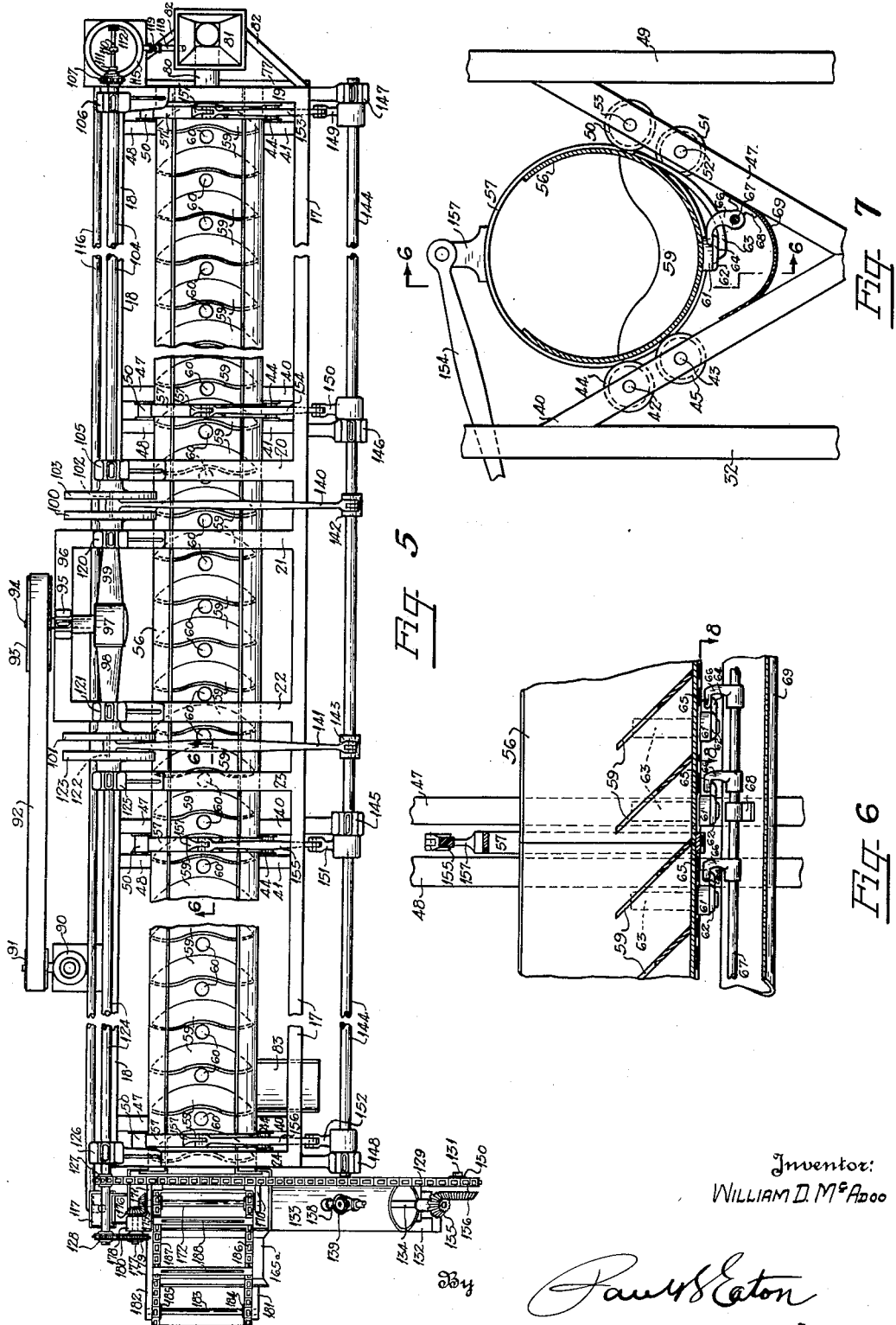

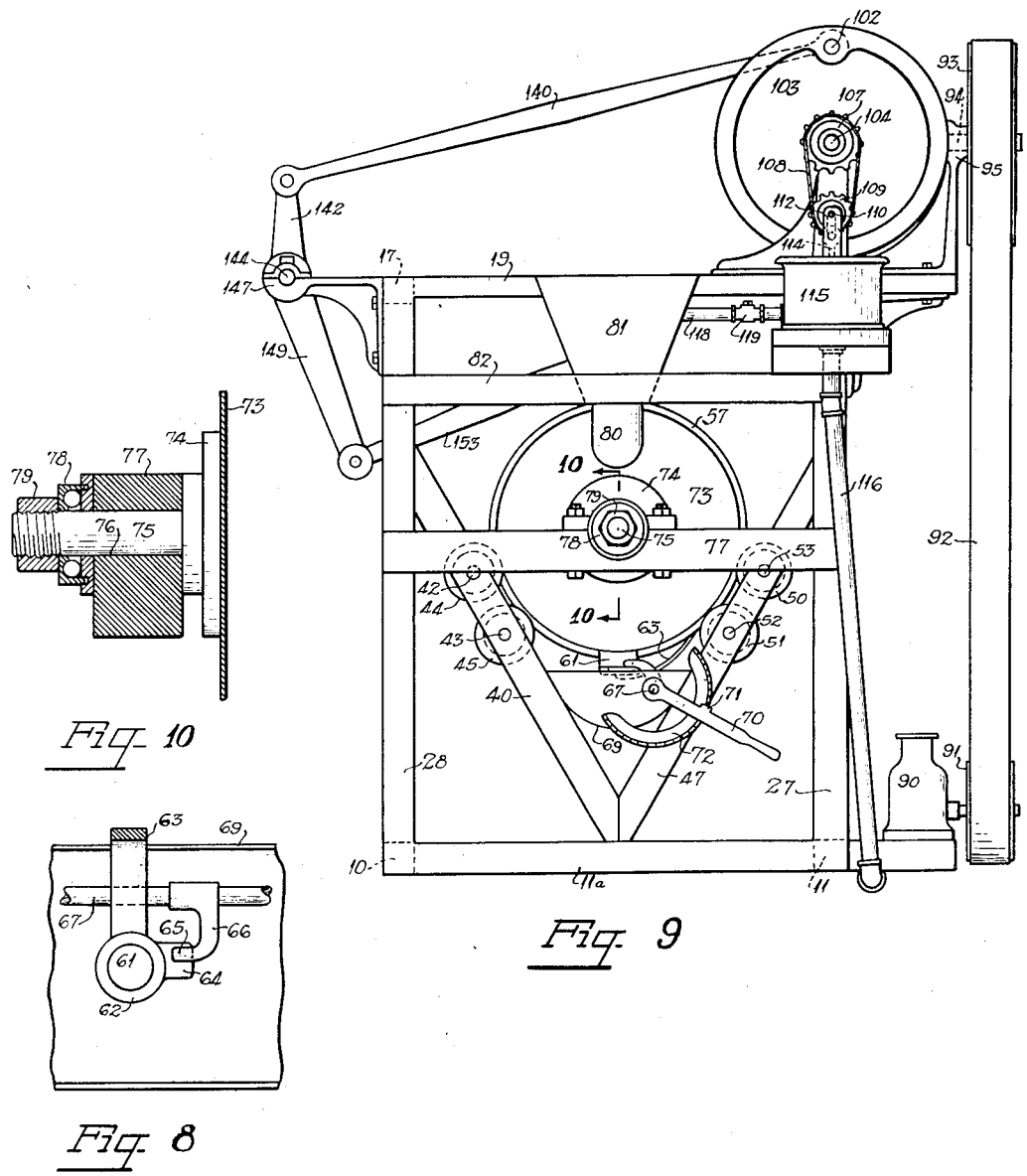

Patented Dec. 5, 1933

1,938,037

UNITED STATES PATENT OFFICE 1,938,037

MEANS FOR SEPARATING VALUABLE MINERALS

William D. McAdoo, Troy, N. C., assignor of one-tenth to Ernest J. Schabelitz, Hendersonville, N. C.

Application June 16, 1932. Serial No. 617,628

11 Claims. (Cl. 209—437)

This invention relates to a method and means wherein mechanical and chemical means are employed for separating heavy minerals, gems and other materials from the natural material in which they are found without a great deal of exertion and with very little power being used.

An object of this invention is to provide a device thru which soil, crushed stone, or any other earthen material may be passed for recovering therefrom gems, certain types of sand, gold, and other minerals which are heavier and have a specific gravity greater than the natural soil or stones in which they are found after the stones have been reduced to pulverized form.

In placer mining, heretofore employed in many different forms it has been customary to direct soil or crushed stone, together with a large quantity of water, over amalgamated plates for recovering therefrom gold which has necessitated the large amount of water. Also in sluice mining it has been customary to throw a large quantity of water onto loosened soil or onto a hillside to wash the soil over a plurality of sluice boxes for the purpose of recovering from said sluice boxes, gold, gems and other materials which are heavier than the water or the materials in which they are found in nature.

It is an object of this invention to provide a mechanism wherein the natural soil or sand or crushed stone or the like, is passed thru a device which has means therein for aiding in the passage of the material and having means for imparting a rocking motion to said device to aid in the passage therethrough of the material and passing with the material water, recovering the water at the discharge end of the device and using the water over and over again in conjunction with new materials as such material is being passed thru the machine in combination with means associated with the discharge end of the machine whereby an emulsion and the like can be formed so as to cause microscopic or free gold, or other minerals or oils or sand to float on top of the surface of the water at the discharge end of the device with means for wiping the foam and the like from the top of the water at the discharge end of the box and recovering therefrom the valuable materials produced by such emulsion.

In describing the above, I have used the term water, but it is to be understood that this device can be used in conjunction with certain chemical solutions in lieu of water where the peculiar process being carried out warrants the use of such chemical composition.

Some of the objects of the invention having been stated, the invention will be more fully understood when taken in connection with the accompanying drawings, in which—

Figure 1 is a front elevation of the machine;

Figure 2 is an end view of an enlarged scale taken along the line 2—2 in Figure 1;

Figure 3 is an enlarged vertical sectional view taken along the line 3—3 in Figure 2;

Figure 4 is an enlarged vertical sectional view taken along the line 4—4 in Figure 3;

Figure 5 is a plan view of the machine;

Figure 6 is an enlarged vertical sectional view taken along the line 6—6 in Figures 5 and 7;

Figure 7 is a transverse sectional view taken along the line 7—7 in Figure 1;

Figure 8 is an enlarged detail view taken along the line 8—8 in Figure 6;

Figure 9 is a right hand end view of Figure 1;

Figure 10 is an enlarged sectional view taken along the line 10—10 in Figure 9.

Referring more specifically to the drawings, the framework of the machine is composed of longitudinally disposed base members 10 and 11 secured together at their ends by means of end members 11a and 12. The apparatus may be mounted by any suitable means such as wheels 16 and 13 as shown in Figure 1, it being understood that similar wheels will be disposed on the other side of the machine as the wheels 16 will be in pairs and wheels 13 in pairs mounted on suitable bearings 14 and 15 so that the apparatus may be transported from place to place or moved over the location being treated so the machine may be moved along as desired. If desired, the wheels may be disposed with and suitable blocks used for giving the desired angle of inclination to the machine. Also the pair of wheels 15 may be interchanged with pair of wheels 16 to retard flow of the material through the machine.

The top of the framework is composed of longitudinal members 17 and 18 joined together by means of cross pieces 19, 20, 21, 22, 23 and 24 and similar cross pieces 20a, 21a, 22a and 23a are provided between the two longitudinally disposed base members 10 and 11. A longitudinally disposed member 25 is provided mid-way between members 10 and 11 and parallel thereto and is secured to lower cross members 20a to 23a inclusive and end members 11a and 12.

Suitable end uprights 27 and 28 are secured between the upper and lower framework and at the other end of the device uprights 29 and 30 are provided similar to uprights 27 and 28. Intermediate uprights 31, 32, 33, 34, 35 and 36 are provided spanning the distance between the outer longitudinally disposed members 10 and 11 respectively and the upper longitudinally disposed members 17 and 18 respectively.

Four pairs of cradle members are provided for supporting the cylindrical member, to be presently described. These cradle members are identical in structure and similar reference characters given to one set of cradle members applies to the whole structure. These cradle structures comprise angularly disposed members 40 and 41 having their upper ends secured to one pair of uprights such as 32 and 33 and having their lower ends resting on longitudinally disposed member 25.

Piercing members 40 and 41 are pins 42 and 43 having flanged rollers 44 and 45 thereon. The other side of the cradle apparatus is composed of spaced members 47 and 48 having their lower ends secured to longitudinal member 25 and having their upper ends secured to uprights between members 11 and 18 which uprights are identical to the uprights shown in the front elevation of Figure 1, such as 32 and 33 and which are designated in Figure 7 by reference character 49.

Disposed between members 47 and 48 are flanged rollers 50 and 51 mounted on pins 52 and 53. Suitable braces 54 and 55 may be secured between certain portions of the machine for strengthening the same; however, if the parts be welded together these braces will not be necessary.

Rockably mounted on flanged rollers 44, 45, 50 and 51 is an elongated cylindrical member 56 which has its upper portion open and this member 56 may be made in one piece or in sections and joined together by rings 57 as well as having such rings 57 at each end thereof. These rings are adapted to rest on flanged rollers 44, 45, 50 and 51 and the flanges on said rollers prevent longitudinal movement of cylinder 56. Cylinder 56 has a plurality of angularly disposed vanes 59 therein and between each vane is a hole 60 penetrating cylinder 56. These holes are normally closed by a valve member comprising a disk of rubber or other material 61 resting on a metallic base 62 which is supported by a leaf spring 63 and metallic base 62 has a lip 64 which is adapted to be engaged at times by a tongue 65 on arm 66 rigidly mounted on rod 67 passing thru the machine and mounted in suitable bearings 68 disposed within trough 69 for catching gems, certain sands, gold and other heavy material which may lodge in holes or pocket 60.

The end of rod 67 has secured thereon a lever 70 having a lip 71 engaging a rack 72 while adjusting the lever in position. In normal operation, lever 70 will be turned clock-wise in Figure 9 so as to cause arms 66 and their lips 65 to be out of the path of projections 64 when the cylinder 56 is rocking in its cradle members as above described.

One end of cylinder 56 is closed by disk 73 and has a flange 74 thereon which has integral therewith a spindle 75 penetrating bearing 76 mounted on cross member 77 and this spindle has a suitable bearing 78 on the end thereof with nut 79 securing the same in position so as to take care of some of the end play of cylinder 56 and prevent its moving longitudinally of the framework when either end is higher than the other end during operation of the machine. A flexible conduit such as a hose 80 penetrates disk 73 and has its other end connected to a hopper 81 secured on brace 82 into which material is fed for being passed thru the machine.

Lower end of trough 69 has laterally directed trough 83 associated therewith so that materials dumped from pocket formed by means of holes 60 and valves 61 may be directed into a suitable receptable not shown.

A suitable source of motive power such as a steam engine 90 is provided having a pulley 91 on which is mounted a belt 92 which passes over a pulley 93 secured on shaft 94 mounted in bearing 95 secured on member 96 forming a part of cross pieces 21 and 22. Shaft 94 projects into a differential 97 having laterally projecting portions 98 and 99 which is similar in all respects to the differential of an automobile and the axle housing and the portions 98 and 99 correspond to the axle housing, housing a shaft on the ends of which disks 100 and 101 are mounted. Disk 100 is connected by means of a suitable bolt 102 to a disk 103 fixed on shaft 104 mounted in bearings 105 and 106, having a sprocket 107 on the end thereof which has a sprocket chain 108 thereon passing over a sprocket 109 mounted on a shaft 110 which is mounted in bearings 111 and 112 and has a crank 113 thereon to which is connected connecting rod 114 for driving a diaphragm pump 115, the structure of said pump not being shown, it being conventional. From the lower ends of pump casing 115 extends a pipe 116 which leads to the other end of the mechanism and is connected to a hopper 117. A pipe 118 having a check valve 119 therein is connected to diaphragm casing 115 and leads into hopper 81, so that water is elevated thru pipes 116 and forced thru check valve 119 and pipe 118 into hopper 81 where the water mixes with the material being dumped into hopper 81.

Bearings 105 and 106 have integral therewith suitable downwardly and laterally extending brackets which are secured to cross pieces 19 or 20 as the case may be. The shaft housed within axle housings 98 and 99 is rotatably mounted in bearings 120 and 121 mounted on cross members 21 and 22 respectively.

Disk 101 has a pin 122 therein which is also secured to disk 123 on shaft 124 which shaft 124 is mounted in bearings 125 and 126, said shaft having a sprocket wheel 127 thereon and another sprocket 128. Sprocket 127 has a sprocket chain 129 thereon mounted on sprocket 130 mounted on shaft 131 rotatably mounted in member 132, said member 132 supporting a cylindrical casing 133 and in said casing 133 is mounted a spiral conveyer 134 having a bevel gear 135 on the upper end thereof meshing with bevel gear 136 fixed on shaft 131. Member 132 extends downwardly into container 160 and is supported at its lower end by means of cantilever beam 168 which beam 168 is connected to frame member 12 in any conventional manner. Cylindrical casing 133 is supported by member 132 which in turn is braced by a piece of strap iron 137 secured to upright 30. Additional water from any convenient source may be introduced into cylindrical casing 133 thru pipe 138 having valve 139 therein.

Pin 102 has mounted thereon a connecting rod 140 and pin 122 has mounted thereon a connecting rod 141, connecting rods 140 and 141 being connected to arms 142 and 143 fixed on shaft 144 rotatably mounted in bearings 145 and 146 which bearings have laterally and downwardly extending portions secured to the framework of the machine in any suitable manner. The ends of shaft 144 are suitably mounted in similar bearings 147 and 148. Fixedly secured on shaft 144 are downwardly projecting arms 149, 150, 151 and 152. The lower ends of arms 149 to 152 inclusive have secured thereto connecting rods 153, 154, 155 and 156, the other ends of said connecting rods being pivotally secured to projections 157 secured on rings 57.

A suitable container 160 is provided below the discharge end of cylindrical member 56 and into which the contents of member 56 are continually discharged. Container 160 has an opening 161 in one end thereof opening into a smaller container 162 having one side portion thereof lower than the other and a lip 163 for emptying the water or other liquid used in the process into funnel or hopper 117. The opening 161 is normally below the liquid level maintained in container 160 as the normal liquid level is regulated by height of the upper portion bent inwardly and downwardly as at 164 and secured to the outside of container 160 is a smaller container 165 having transversely disposed rods 166.

Secured to one of the ends of cradle structures carrying the flanged rollers are brackets 170 and 171 in which is mounted a transversely disposed rod 172 having sprockets 173 and 174 thereon, rod 172 having on one end thereof a bevel gear 175 meshing with a bevel gear 176 mounted on shaft 177 mounted in bearing member 178 and sprocket 179 is secured on shaft 177 and has a sprocket chain 180 mounted on said sprocket and said sprocket 128 on shaft 124 for imparting rotation to shaft 172. Extending upwardly from the lower portion of container 160 are braces 181 and 182 having rotatably mounted in the upper end thereof transversely disposed rod 183 having sprocket wheels 184 and 185 thereon, said sprocket wheels and the sprocket wheels on shaft 172 receiving sprocket chains 186 and 187 and disposed on said sprocket chains are paddle members or vane members preferably composed of flexible material such as rubber and indicated by reference character 188, the purpose of these vanes being to pass over the top of the liquid level in container 160 and wipe the foam therefrom and deliver it into container 165 and transverse rods 166 aid in removing the foam from the paddles or vanes 188. This foam is caused by an emulsion of soap or any other suitable emulsifying agent introduced into the machine for forming an emulsion on the top of liquid contained in container 160 so as to cause lighter material such as free gold and the like to be suspended in such emulsion and foam and to be easily removed and deposited in container 165.

Container 165 has a spout 165a under which a suitable container can be placed for receiving the material deposited in container 165.

The method of operation of the apparatus is as follows:

Engine 90 is started in operation which causes connecting rods 140 and 141 to impart oscillatory movement to shaft 144 which thru arms 149 and 152 and connecting rods 153 to 156 imparts oscillatory or rocking motion to cylinder 56 which has the vanes 59 therein. At the same time soil, comminuted earth, stone and the like are introduced into hopper 81 along with a suitable amount of water or a chemical solution if desired, and this earthen material along with the solution is passed thru the apparatus and the rocking motion imparted to cylinder 56 causes vanes 59 to aid in the separation of the elements of the material as it passes thru the apparatus. In fact it has been found that good operation of the machine can be had while the discharge end of the rocking cylinder 56 is higher than the feed end of the cylinder, as the vanes 59 push the material including the liquid through the cylinder 56. By adjusting the position of the discharge end of the cylinder 56 the rate of passage of the material and liquid through the cylinder 56 is regulated. The heavier metals, gems, sand and the like will naturally lodge in holes 60 which are closed by valves 61 during the rocking motion as rod 67 is turned by lever 70 to cause members 66 and their lips 65 to be out of the path of projections 64. The material and solution, whether it be water or chemical solution, as they pass from the discharge end of the cylinders 56, are deposited into container 160 and the wipers or vanes on sprocket chain 186 and 187 wipe the foam off the top of liquid level of container 160 as a suitable emulsifying agent is placed in the container 160 or can be introduced thru hopper 81 if desired.

The surplus water or solution passes off thru opening 161 and overflows into hopper or funnel 117 and is returned thru pipe 116 and pump 115 again into hopper 81. At such intervals as may be desired, engine 90 may be stopped and while cylinder 56 is in stationary upright position with holes 60 occupying the lowermost plane, lever 70 is moved counterclockwise and lips 65 engage projection 64 and move members 61 away from contact with the cylinder surrounding hole 60 and the deposits in said hole 60 are allowed to fall into trough 69 and this is carried out thru trough 83 into a suitable container. During operation of the machine additional fluid such as water or a chemical composition may be introduced into cylindrical member 133 which aids in washing desirable minerals and other ingredients out of the material as it is being removed from container 160 by spiral member 134 which extends into container 160 and this goes out thru opening 161 into funnel 117 and is again reintroduced into hopper 81.

It is thus seen that this device may be continuously operated except for stopping at frequent intervals to dump the contents contained within holes 60 and it is thus obvious that this device may be used not only at a fixed location by having the material conveyed thereto, but the device may be moved down a valley and the surrounding earth may be dumped into the apparatus by moving the apparatus from time to time and in this way, great quantities of eroded soil from mountain and hillsides collecting in the valleys can be passed thru this machine to extract therefrom valuable minerals, gems and the like.

In the drawings and specification there has been set forth a preferred embodiment of the invention, and although specific terms are employed, they are used in a generic and descriptive sense only and not for purposes of limitation, the scope of the invention being set forth in the appended claims.

I claim:

1. In an apparatus for separating heavier materials from lighter materials when the same are intermixed in a composition of matter, an elongated member having an intake portion and a discharge portion and also having a plurality of transversely and obliquely disposed vanes in the bottom portion thereof, whose upper edges are closer to the discharge portion than their bottom edges, said elongated member having a plurality of holes in the bottom portion thereof, means for normally closing said holes, means for feeding comminuted material accompanied by a liquid solution into the intake portion of said elongated member, means for oscillating said elongated member about its longitudinal axis, and means for opening said closing means for said holes when said elongated member is in stationary position.

2. In a device for separating heavier materials from lighter materials when said materials are intermixed with each other, an elongated hollow member and at least partially suspended in a fluid, a plurality of transversely and obliquely disposed vanes in said member, said member having a plurality of holes therein, means for normally closing said holes, means for imparting transverse oscillatory movement to said elongated hollow member about its longitudinal axis, means for feeding material into the discharge end of said elongated hollow member, means for receiving the material passed thru said elongated member, the top of the vanes being nearer the discharge end of the hollow member than the intake end whereby the vanes will propel the material towards said discharge end.

3. Means for separating gold, gems, and heavier materials from soil, comminuted stone and the like, which comprises an elongated tubular member having an intake end and a discharge end, means for rockably mounting said tubular member to rock or oscillate with its longitudinal axis as a center, a plurality of vanes in said tubular member angularly disposed with relation to the transverse axis of said tubular member, so that the upper edge of said vanes will be closer to the discharge end of the tubular member than the intake end whereby oscillation of the tubular member will cause said vanes to propel said comminuted stone and the like towards the discharge end of said tubular member.

4. Means for separating gold, gems, heavy sand and the like from earth, which comprises an agitating device having a plurality of transversely disposed vanes therein angularly disposed with relation to the transverse axis of said agitating device, means for imparting transverse oscillatory motion to said device, means for feeding earth and liquid to one end of said device, the upper portions of said vanes projecting towards the discharge end of said agitating device whereby oscillation of the same will propel the liquid and earth towards the discharge end of the agitating device.

5. In an apparatus for washing soil to extract therefrom materials having a greater specific gravity than the mean specific gravity of the soil, comprising an elongated vessel having a receiving end and a discharge end, a plurality of transversely disposed vanes secured in said member, said vane extending from the bottom of said vessel towards the discharge end of the vessel, and means for imparting transverse oscillatory movement to said member.

6. Means for separating metals, gems and the like from earth which comprises an elongated horizontally disposed hollow member having a plurality of holes in the bottom portion thereof, means for normally closing said holes, means for opening said closing means at will, means for receiving discharges from said holes, a plurality of vanes secured in the bottom of said hollow member, said vanes being at right angles to the longitudinal axis of said hollow member and extending towards the discharge end of the hollow member whereby transverse oscillatory motion of the hollow member will cause said vanes to push the material towards the discharge end of the hollow member, and means for imparting transverse oscillating motion to said hollow member.

7. Means for separating gold and the like from earth which comprises an elongated hollow member, a plurality of transversely disposed vanes mounted in said hollow member and extending upwardly and towards the discharge end of the hollow member, means for imparting transverse oscillatory motion to said hollow member, means for conducting earth and a liquid into one end of said hollow member, the vanes, upon oscillation of the hollow member, serving to propel the material towards the discharge end of the hollow member.

8. Means for washing gold, soil and the like which comprises an elongated tubular member having an intake portion and a discharge portion and having a plurality of transversely disposed vanes therein inclined with relation to the vertical, means for imparting transverse oscillatory motion to said tubular member about its longitudinal axis, the upper edges of said vanes being nearer the discharge portion than their lower edges to propel the contents of the tubular member towards the discharge end upon oscillation of the tubular member.

9. Means for recovering gold and other heavy materials from earth and the like comprising a framework, a circular trough member mounted in the framework, feeding material mixed with a fluid to one end of the trough, means for imparting transverse oscillatory movement to said trough member about its axis, a plurality of transversely disposed vanes in said trough member, said vanes being inclined with relation to the vertical upwardly towards the discharge end, the action of said vanes upon oscillation of said trough member being to propel the fluid and material through the trough member.

10. Means for recovering heavy matter from light matter such as the recovery of gold from soil and the like comprising a framework, a horizontally disposed tubular member mounted in said framework for transverse oscillation therein and having an intake portion and a discharge portion, means for imparting transverse oscillation to said tubular member, said tubular member having in the lower portion thereof a plurality of transversely disposed inclined vanes whose upper portions are nearer the discharge portion of the tubular member than their bottom portions whereby upon oscillation of the tubular member the vanes will propel material fed into the intake portion towards the discharge end.

11. Means for separating heavy materials from lighter materials when the materials are mixed with a liquid comprising a transversely oscillatable elongated hollow member having an intake end and a discharge end, a plurality of transversely disposed inclined vanes in the lower portion of the hollow member having their upper portions nearer the discharge end of the hollow member than the lower portions of the vanes whereby oscillation of the hollow member will cause the vanes to propel material in the hollow member towards the discharge end of the hollow member.

WILLIAM D. McADOO.